(12) United States Patent
Kumthekar et al.

(10) Patent No.: US 8,082,247 B2
(45) Date of Patent: Dec. 20, 2011

(54) BEST-BET RECOMMENDATIONS

(75) Inventors: Aditee Kumthekar, Kirkland, WA (US); Mingyang Zhao, Issaquah, WA (US); Harini Sridharan, Bellevue, WA (US); Qing Chang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/512,845

(22) Filed: Jul. 30, 2009

(65) Prior Publication Data

US 2011/0029509 A1 Feb. 3, 2011

(51) Int. Cl.
*G06F 7/00* (2006.01)
*G06F 17/30* (2006.01)

(52) U.S. Cl. ........................ 707/727; 707/751
(58) Field of Classification Search ........... 707/999.005, 707/722–757
See application file for complete search history.

(56) References Cited

U.S. PATENT DOCUMENTS

| | | | |
|---|---|---|---|
| 5,734,887 A | 3/1998 | Kingberg et al. | |
| 6,202,062 B1 | 3/2001 | Cameron et al. | |
| 6,546,389 B1 * | 4/2003 | Agrawal et al. | 1/1 |
| 6,553,412 B1 | 4/2003 | Kloba et al. | |
| 6,738,764 B2 * | 5/2004 | Mao et al. | 1/1 |
| 6,785,768 B2 | 8/2004 | Peters et al. | |
| 7,051,038 B1 | 5/2006 | Yeh et al. | |
| 7,197,497 B2 * | 3/2007 | Cossock | 1/1 |
| 7,203,909 B1 | 4/2007 | Horvitz et al. | |
| 7,337,370 B2 | 2/2008 | Haynes et al. | |
| 7,340,472 B2 | 3/2008 | Makus et al. | |
| 7,493,352 B2 | 2/2009 | O'Neil et al. | |
| 7,499,939 B2 | 3/2009 | Jandhyala et al. | |
| 7,716,225 B1 * | 5/2010 | Dean et al. | 707/748 |
| 7,752,201 B2 * | 7/2010 | Anderson et al. | 707/731 |
| 7,987,182 B2 * | 7/2011 | Slothouber et al. | 707/722 |
| 2002/0099818 A1 | 7/2002 | Russell et al. | |
| 2002/0103798 A1 | 8/2002 | Abrol et al. | |
| 2002/0123988 A1 * | 9/2002 | Dean et al. | 707/3 |
| 2002/0169868 A1 | 11/2002 | Lopke et al. | |
| 2003/0028591 A1 | 2/2003 | Goloshubin et al. | |
| 2003/0084377 A1 | 5/2003 | Parks et al. | |
| 2003/0115189 A1 | 6/2003 | Srinivasa et al. | |
| 2004/0260715 A1 | 12/2004 | Mongeon et al. | |
| 2005/0071741 A1 * | 3/2005 | Acharya et al. | 715/500 |
| 2005/0210024 A1 | 9/2005 | Hurst-Hiller et al. | |
| 2005/0240580 A1 | 10/2005 | Zamir et al. | |
| 2006/0004711 A1 | 1/2006 | Naam | |
| 2006/0277205 A1 | 12/2006 | Song et al. | |

(Continued)

OTHER PUBLICATIONS

"9 Oracle Net," https://students.kiv.zcu.cz/doc/oracle/gateways.102/b16218/net.htm, pp. 1-6 (Publicly known at least as early as Apr. 22, 2009).

(Continued)

*Primary Examiner* — Shew-Fen Lin
(74) *Attorney, Agent, or Firm* — Merchant & Gould P.C.

(57) ABSTRACT

Best-bet recommendation may be provided. User behavior associated with a search result may be logged and applied to a relevance classifier. The relevance classifier may determine whether the user behavior indicates that the search result may comprise a best-bet result. A best-bet result may comprise a result associated with a high confidence that the result may be satisfactory to a user. The relevance classifier may be trained according to past searches and user behavior to improve the confidence on best-bet recommendations. Once confidence in a search result is high enough, future searches on the same query may provide the best-bet result to the searching user.

19 Claims, 4 Drawing Sheets

U.S. PATENT DOCUMENTS

| | | | |
|---|---|---|---|
| 2007/0121626 | A1 | 5/2007 | Shepard |
| 2007/0208730 | A1 | 9/2007 | Agichtein et al. |
| 2008/0005091 | A1 | 1/2008 | Lawler et al. |
| 2008/0030764 | A1 | 2/2008 | Zhu et al. |
| 2008/0114751 | A1 | 5/2008 | Cramer et al. |
| 2008/0114875 | A1 | 5/2008 | Anastas et al. |
| 2008/0147731 | A1 | 6/2008 | Narayana et al. |
| 2008/0195646 | A1 | 8/2008 | Meijer et al. |
| 2008/0270469 | A1 | 10/2008 | Myerson et al. |
| 2008/0275951 | A1 | 11/2008 | Hind et al. |
| 2008/0281809 | A1 | 11/2008 | Anderson et al. |
| 2008/0294760 | A1 | 11/2008 | Sampson et al. |
| 2009/0006478 | A1 | 1/2009 | Rikhtverchik et al. |
| 2009/0049052 | A1 | 2/2009 | Sharma et al. |
| 2009/0049372 | A1 | 2/2009 | Goldberg |
| 2009/0070337 | A1 | 3/2009 | Romem et al. |
| 2010/0125570 | A1* | 5/2010 | Chapelle et al. ............... 707/722 |
| 2010/0332531 | A1 | 12/2010 | Galande ......................... 707/770 |
| 2010/0332550 | A1 | 12/2010 | Ainslie ........................ 707/802 |
| 2011/0029489 | A1 | 2/2011 | Zhao ............................ 707/648 |
| 2011/0029516 | A1 | 2/2011 | Chang et al. .................. 707/734 |
| 2011/0029581 | A1 | 2/2011 | Zhao et al. .................... 707/812 |

OTHER PUBLICATIONS

"Malaysian Public Sector Open Source Software (OSS) Program Web Application Guidelines," pp. 1-42 (Apr. 2008).

"Objectivity/HA—The High Availability Option," http://www.objectivity.com/pages/objectivity/high_availability.asp, pp. 1-5 (Publicly known at least as early as Apr. 22, 2009).

"Predictive Analysis with SQL Server 2008, White Paper," http://download.microsoft.com/download/6/9/D/69D1FEA7-5B42-437A-B3BA-A4AD13E34EF6/SQL2008PredictAnalysis.docx, pp. 1-15 (Jul. 2008).

"Rdb: Distributed Option," http://www.oracle.com/technology/products/rdb7/htdocs/fs_dist.htm, pp. 1-2 (Publicly known at least as early as Apr. 22, 2009).

"Server-side or client-side web analytics (part 2)," http://www.vdgraaf.info/server-side-or-client-side-web-analytics-part-2.html, 3 pages (Jul. 25, 2007).

"Web analytics," *Wikipedia, the free encyclopedia*, http://en.wikipedia.org/wiki/Web_analytics, 9 pages (Apr. 12, 2009).

"What Makes CardioLog Different The best SharePoint reporting solution," http://www.intlock.com/intlocksite/ProductsAndServices/CardioLog/What-Makes-CardioLog-Different.asp, pp. 1-2 (Copyright 2008).

Agichtein, E. et al., Identifying "Best Bet" Web Search Results by Mining Past User Behavior, *Proceedings of the 12th ACM SIGKDD International Conference on Knowledge Discovery and Data Mining*, Philadelphia, Pennsylvania, 7 pages (Aug. 20-23, 2006).

Bilenko, M. et al., "Mining the Search Trails of Surfing Crowds: Identifying Relevant Websites From User Activity," *Proceeding of the 17th International Conference on World Wide Web*, Beijing, China, 10 pages (Apr. 21-25, 2008).

Bruggeman, M. et al., "Exploring the Data View Web Part," http://www.lcbridge.nl/vision/2009/dvwp.htm, pp. 1-17 (Feb. 19, 2009).

Burton, M. et al., "The Value of Web Log Data in Use-Based Design and Testing," *JCMC*, vol. 6, No. 3, pp. 1-26, http://jcmc.indiana.edu/vol6/issue3/burton.html (Apr. 2001).

Chang, F. et al., "Bigtable: A Distributed Storage System for Structured Data," *OSDI* 2006, pp. 1-14 (2006).

Eckerson, W., "Federating Distributed Data," *Information Management Magazine*, http://www.information-management.com/issues/9991101/1555-1.html, pp. 1-2 (Nov. 1, 1999).

Horowitz, J. et al., "Decomposing Heterogeneous Inter-Entity Relationship Updates," *IEEE Transactions on Knowledge and Data Engineering*, vol. 4, No. 4, pp. 360-370 (Aug. 1992).

Huang, Z. et al., "A Graph Model for E-Commerce Recommender Systems," *Journal of the American Society for Information Science and Technology*, vol. 55, No. 3, pp. 259-274 (2004).

Imhof, J., "Web search enhancement based on User Behaviour Information," https://www.dbis.ethz.ch/education/ss2007/07_dbs_algodbs/ImhofReport.pdf, pp. 1-23 (Jun. 11, 2007).

Imhoff, C., "Active Data Warehousing—the Ultimate Fulfillment of the Operational Data Store," http://www.teradata.com/t/assets/0/206/276/33b475d5-edlc-4eef-81be-51507e7c0667.pdf, pp. 1-14 (Copyright 2001).

Jones, M., "Web-based Data Management," http://www.ecoinformatics.org/pubs/guide/jones.fv2.htm, pp. 1-8 (Publicly known at least as early as Apr. 22, 2009).

Norguet, J. et al., "A Page-Classification Approach to Web Usage Semantic Analysis," *Engineering Letters*, vol. 14, 7 pages (Feb. 12, 2007).

Olamendy, J., "Distributed Database Management Systems," http://www.c-sharpcorner.com/UploadFile/john_charles/DistributedDatabaseManagementSystems12172008141339PM/DistributedDatabaseManagementSystems.aspx, pp. 1-3 (Dec. 17, 2008).

Olszak, C. et al., "Business Intelligence Systems in the Holistic Infrastructure Development Supporting Decision-Making in Organisations," *Interdisciplinary Journal of Information, Knowledge, and Management*, vol. 1, pp. 47-58 (2006).

Qiu, F. et al., "Automatic Identification of User Interest for Personalized Search," *Proceedings of the 15th International Conference on World Wide Web*, Edinburgh, United Kingdom, 10 pages (May 22-26, 2006).

Son, L. et al., "The Visualisation of Internet Usage," *Southern African Networks and Applications Conference (SATNAC)* 2004, 6 pages (Sep. 6-8, 2004).

Strumme, G. et al., "Usage Mining for and on the Semantic Web," *Proc. NSF Workshop on Next Generation Data Mining*, Baltimore, Maryland, 10 pages (Nov. 2002).

U.S. Appl. No. 12/512,859, filed Jul. 30, 2009, entitled "Web-Usage Pattern Insight Platform".

U.S. Appl. No. 12/492,704, filed Jun. 26, 2009, entitled "Platform for Configurable Logging Instrumentation".

U.S. Appl. No. 12/492,675, filed Jun. 26, 2009, entitled "Batched Transfer of Arbitrarily Distributed Data".

U.S. Appl. No. 12/512,661, filed Jul. 30, 2009, entitled "Dynamic Information Hierarchies".

U.S. Appl. No. 12/512,776, filed Jul. 30, 2009, entitled "Load-Balancing and Scaling for Analytics Data".

Velayathan, G. et al., "Behavior Based Web Page Evaluation," *Proceedings of the 16th International Conference on World Wide Web*, Banff, Alberta, Canada, pp. 1317-1318 (May 8-12, 2007).

Wade, A., "Single Logical View over Enterprise-Wide Distributed Databases," *Proceedings of the 1993 ACM SIGMOD International Conference on Management of Data*, Washington, D.C., pp. 441-444 (May 26-28, 1993).

Zhu, T. et al., "Using Learned Browsing Behavior Models to Recommend Relevant Web Pages," *International Joint Conferences on Artificial Intelligence*, http://dli.iiitac.in/ijcai/IJCAI-05/PDF/post-0462.pdf, 3 pages. (Aug. 1, 2005).

U.S. Official Action in U.S. Appl. No. 12/492,704, dated Sep. 13, 2011.

* cited by examiner

BEST-BET RECOMMENDATIONS

RELATED APPLICATIONS

Related U.S. patent application Ser. No. 12/512,859, filed on Jul. 30, 2009 entitled "Web Usage Pattern Insight Platform," assigned to the assignee of the present application, is hereby incorporated by reference.

Related U.S. patent application Ser. No. 12/492,704, filed on Jun. 26, 2009 entitled "Platform for Configurable Logging Instrumentation," assigned to the assignee of the present application, is hereby incorporated by reference.

Related U.S. patent application Ser. No. 12/492,675, filed on Jun. 26, 2009 entitled "Batched Transfer of Arbitrarily Distributed Data," assigned to the assignee of the present application, is hereby incorporated by reference.

Related U.S. patent application Ser. No. 12/512,661, filed on Jul. 30, 2009 entitled "Dynamic Information Hierarchies," assigned to the assignee of the present application, is hereby incorporated by reference.

Related U.S. patent application Ser. No. 12/512,776, filed on Jul. 30, 2009 entitled "Load-Balancing and Scaling for Analytics Data," assigned to the assignee of the present application, is hereby incorporated by reference.

BACKGROUND

Best-bet recommendation is a process for finding relevant search results. In some situations, search algorithms do not take advantage of usage patterns to improve search results. For example, search terms entered by users may not be associated with relevant results. In other situations, the conventional strategy is for a human administrator to manually associate search terms with relevant content. This often causes problems because the conventional strategy is time-consuming, tedious, and subjective. For example, the administrator often relies on personal knowledge rather than adapting a search system to the needs of the users.

SUMMARY

Best be recommendation may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Best-bet recommendation may be provided. User behavior associated with a search result may be logged and applied to a relevance classifier. The relevance classifier may determine whether the user behavior indicates that the search result may comprise a best-bet result. A best-bet result may comprise a result associated with a high confidence that the result may be satisfactory to a user. The relevance classifier may be trained according to past searches and user behavior to improve the confidence on best-bet recommendations. Once confidence in a search result is high enough, future searches on the same query may provide the best-bet result to the searching user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
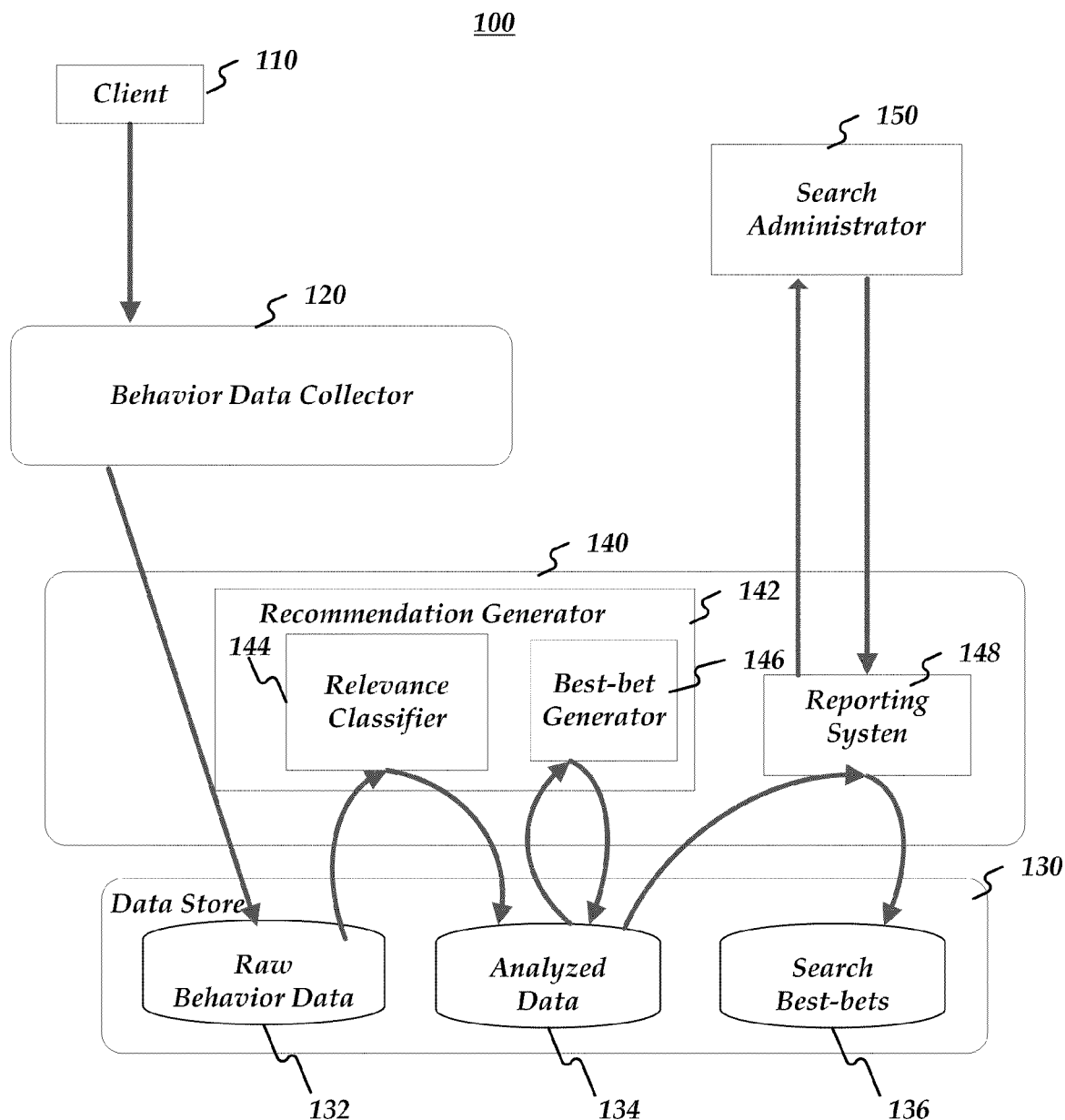
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Best-bet recommendations may be provided. Consistent with embodiments of the present invention, a system may analyze user behavior to generate best-bet recommendations. For example, the system may process search queries and return multiple results to a user. The user's result selections and behaviors may be analyzed in light of past user behaviors to decide whether a selected result may comprise a best-bet. Best-bets may be added to the search system with no and/or little human interaction, allowing the system to scale as data grows over time. Best-bets may be produced and/or improved objectively without relying on any particular human's knowledge. The system may also automatically adapt to different usage patterns, thus being capable of generating different recommendations based on the target audience.

FIG. 1 is a block diagram of a best-bet system 100 comprising a client device 110, a behavior data collector 120, a data store 130, a application server 140, and a search administrator 150. Behavior data collector 120 may comprise a device and/or an application associated with application server 140 operative to capture user behaviors and/or characteristics of client device 110 and/or application server 140. Behavior data collector 120 may also be operative to capture search queries from client device 110 and/or search results from application server 140.

Client device 110 may issue a query and receive search results back from a network connected server, such as application server 140. A user of client device 110 may select a result and behavior data collector 120 may capture the user's behavior, such as what queries were issued, what results the user clicked for these queries, page dwell time, and on which query the user finished. This user-behavior data may be stored in a raw behavior database 132 and accessed by a recommendation generator 140 comprising a relevance classifier 144 and a best-bet generator 146. Relevance classifier 144 may analyze the user-behavior data to predict user-satisfaction with the search results, such as by determining whether a given search result was relevant to the user's search query.

The predictions may be stored in an analyzed data database 134 and statistically analyzed by best-bet generator 146 to determine if a particular search result is significantly and positively correlated to a particular query. Such correlations may be reported to search administrator 150 by a reporting system 148. Search administrator 150 may approve the correlations, or the correlations may be automatically approved if a confidence associated with the correlation is high enough. Approved correlations may be added to a best-bet store 136. The next time a user issues a query, the search system may looks into best-bet store 136 to determine if there are any relevant best-bets, and if so, surface them prominently to the user.

Over time, as more user-behavior data is collected, the system may recommend new best-bets, or improve best-bet recommendations for queries. Because of the predictive and statistical nature of the system, it can automatically adjust to current user trends. Thus a previously recommended best-bet might not be relevant anymore; the system can detect obsolete best-bets and recommend new ones.

Figure 2A:
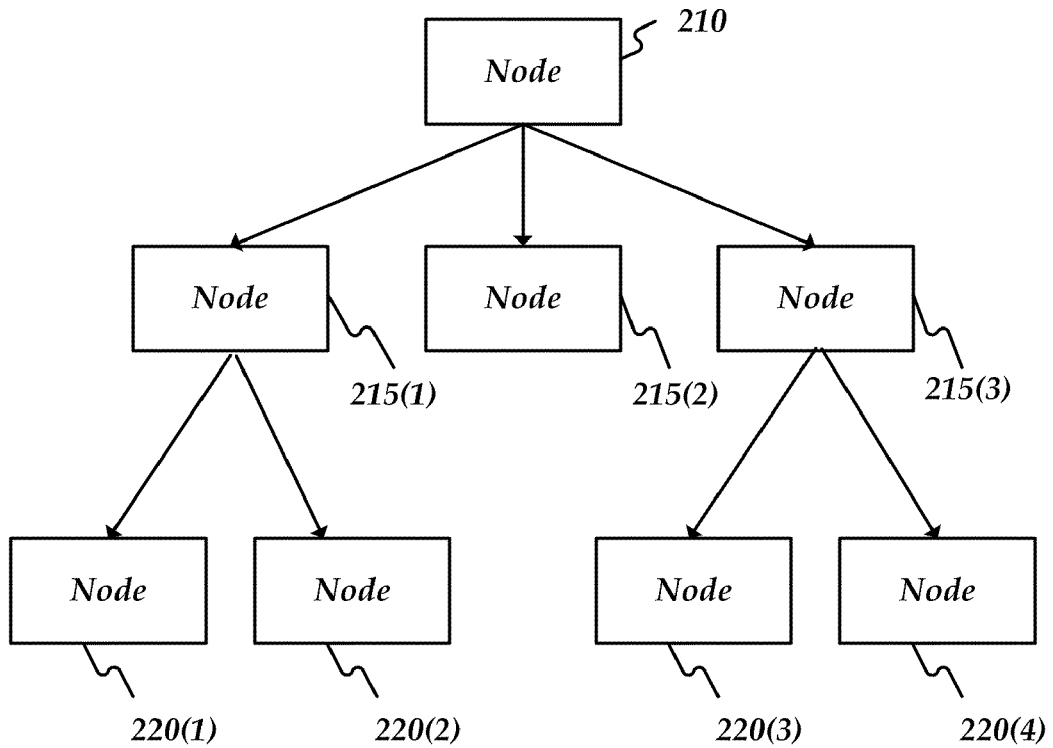
FIGS. 2A-2B are block diagrams illustrating a decision tree.

FIG. 2A is a block diagram of relevance classifier 144 comprising a decision tree 200. Decision tree 200 may comprise a first decision node 210, a plurality of second level decision nodes 215(1), 215(2), and 215(3), and a plurality of third level decision nodes 220(1), 220(2), 220(3), and 220(4). Decision tree 200 may comprise any number of levels, each associated with a relevance factor, and each level may comprise more and/or less nodes.

Figure 2B:
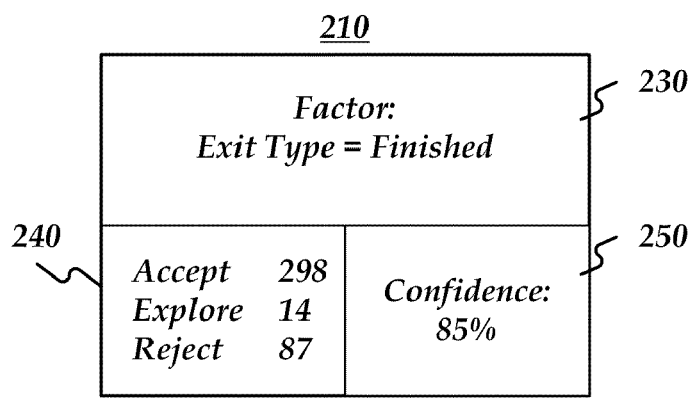

FIG. 2B is a block diagram of a decision node such as decision node 210. Decision node 210 may comprise a relevance factor 230, a relevance category count 240, and a confidence rating 250. For example, decision node 210 may comprise a relevance factor of an exit type (i.e. whether the user's search finished or whether the user kept viewing other results after viewing the result being analyzed).

For other results with the same relevance factor, user behavior may have been classified according to categories such as accept, explore, or reject. Results in the accept category may comprise, for example, results for which the user provided positive feedback (e.g. a ranking selection or behaviors such as bookmarking and printing). Results in the explore category may comprise, for example, results for which the user may have provided no and/or neutral feedback (e.g. a long dwell time and/or following links from the search result to other pages). Results in the reject category may comprise, for example, results for which the user provided negative feedback (e.g. a short dwell time indicating the user quickly closed the result and/or issuing a new search query to retrieve a new set of results).

Confidence rating 250 may comprise a confidence percentage associated with the relevance factor of decision node 210. For example, a relevance factor comprising a captured user behavior of an exit type being finished may comprise a confidence rating of 85%. The confidence ratings of any and/or all of the relevance factors applied to a search result may be summed, averaged, or otherwise calculated (e.g. by weighting the different relevance factors) to produce a final confidence that the search result may comprise a potential best-bet result. Consistent with embodiments of the invention, only search results with a final confidence over a threshold may be presented as potential best-bets. Further consistent with embodiments of the invention, if the final confidence of a search result exceeds a second confidence threshold, the search result may be added to best-bet store 136 without waiting for approval from search administrator 150.

Confidence rating 250 may be determined according to a number of criteria. For example, a relevance factor with a number of "accept" counts greater and/or equal to a configurable metric may have a high confidence, while a relevance factor with a number of "reject" counts greater and/or equal to a configurable metric may have a low confidence. A ratio of "accept" to "reject" counts may be used to compute a relevance factor's confidence value, such as a 75% confidence value when "accept" to "reject" counts are at least 3:1. Confidence values may automatically change over time as more results are applied to decision tree 200 and/or may be manually configured by an administrator such as search administrator 150.

For example, behavior associated with a search result may be applied to decision tree 200 as follows. Relevance classifier 144 may begin at decision node 210 that comprise a relevance factor of a user's page dwell time (i.e. how long the user viewed the page in a browser). A page dwell time of 5-20 seconds may result in branching to second level decision node 215(1), a page dwell time of less than 5 seconds may cause relevance classifier 144 to branch to second level decision node 215(2), and a page dwell time of more than 20 seconds may cause relevance classifier 144 to branch to second level decision node 215(3). Node 215(2) may comprise a low enough confidence (e.g. as a result of far more "reject" classifications than "accept classifications) to halt processing of the result as a best-bet, while node 215(1) and 215(3) may continue the process.

Relevance classifier 144 may then apply the next relevance factor, for example, exit type, to each branch. Node 215(1) may branch to node 220(1) if the exit type was finished and to node 220(2) if the user continued searching and/or exploring results. Node 215(3) may branch to node 220(3) if the exit type was finished and to node 220(4) if the user continued searching and/or exploring results. By having each second level node branch onto separate, respective decision nodes, relevance classifier 144 may result in a different confidence based on several different captured user behaviors. For example, search result associated with a dwell time greater than 20 seconds (node 215(3)) and an exit type of finished (node 220(3)) may comprise a higher final confidence value than a result associated with a dwell time between 5-20 seconds (node 215(1)) and an exit type of finished (node 220(1)).

Figure 3:
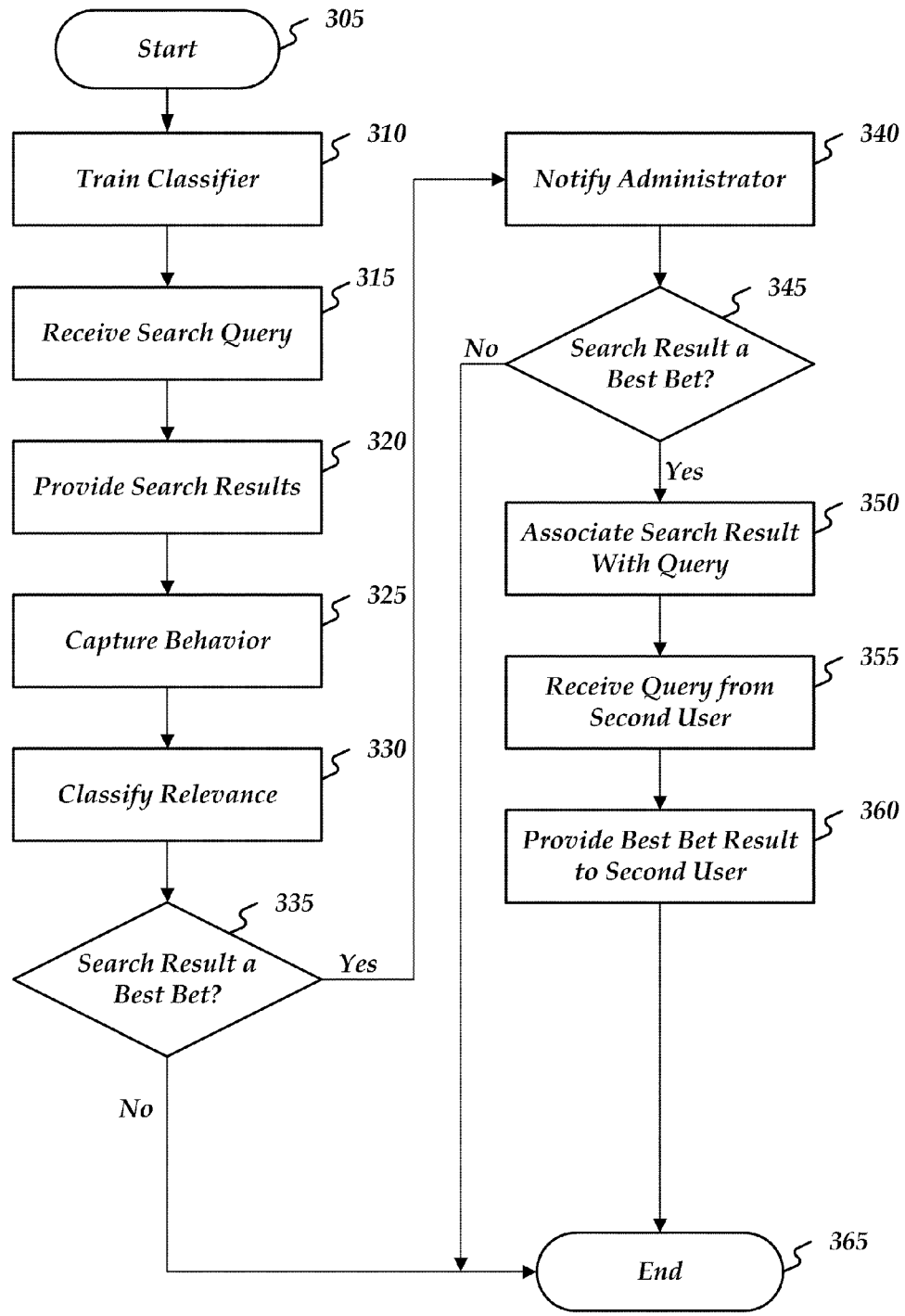
FIG. 3 is a flow chart of a method for providing best-bet recommendations.

FIG. 3 is a flow chart setting forth the general stages involved in a method 300 consistent with an embodiment of the invention for providing best-bet recommendations. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may train a relevance classifier. For example, relevance classifier 144 may comprise decision tree 200. Computing device 400 may receive previously collected log data, such as captured user behaviors and/or explicit user feedback. For example, log data associated with each of a plurality of web pages may comprise an overall feedback categorization for the page (e.g. accepted, explored, and/or rejected). Each item of log data associated with the page may also comprise a relevance factor, such as dwell time, exit type, page actions (e.g. print, save, bookmark), scrolling activity, a time the search query was issued, a time the search result was selected, a display position of the search result in the list of search results, a user feedback associated with the at least one of the plurality of search results (e.g. a rating input by the user into a user interface component of the web page), a count of selections by the user from the plurality of search results, and/or how many links from the page a user followed, the order in which the user viewed the search results presented, the language of the query, and a number of seconds between the time the search query was issued and the first search result was selected.

The log data for each page may be applied to the decision tree by determining whether the relevance factor already has a node in the tree and updating the existing node's relevance category counts if so, or creating a new decision level in the tree associated with the new relevance factor if not. For example, decision tree 200 may comprise node 210 associated with a relevance factor of "page bookmarked" and nodes 215(1), 215(2), 215(3) associated with a relevance factor of dwell time 5-20 seconds, dwell time<5 seconds, and dwell time>20 seconds, respectively. Log data associated with a page categorized as "accepted" may comprise a captured behavior indicating that the user bookmarked the site, that the user had a dwell time of 98 seconds, and that the user's search finished after viewing the page (exit type=finished). Computing device 400 may increment the "accept" category count by 1 for node 210 and node 215(3) due to the page being bookmarked and having a dwell time>20 seconds. Computing device 400 may then add a new level associated with the page's exit type comprising node 220(3), where node 220(3) has a relevance factor of exit type=finished and initialized with category counts of accept=1, explore=0, and reject=1. Consistent with embodiments of the invention, computing device 400 may add nodes 220(1), 220(2), and/or 220(4) as part of adding the new level, or computing device 400 may wait until log data with an appropriate relevance factor is processed to create the nodes (e.g. wait until a page with a dwell time of 12 seconds and an exit type of finished is processed before creating node 220(1) to keep track of relevance category counts). Relevance classifier 144 may thus learn from past data so that it may predict results for future data. As relevance category counts are updated, confidence values may be assigned to each of the plurality of decision nodes.

After training the relevance classifier in stage 310, method 300 may advance to stage 315 where computing device 400 may receive a search query from a user. For example, application server 140 may receive a search query, such as "television listings," from client 110. Behavior data collector 120 may associate the search query with an identifier, such as a user id and/or a browser session id, associated with a user of client 110.

From stage 315, method 300 may advance to stage 320 where computing device 400 may provide a plurality of search results to the user. For example, application server 140 may search a database of results for appropriate responses to the search query. In response to the "television listings" query above, search results may include a plurality of web pages associated with local cable operators and national listing aggregators. Application server 140 may provide the plurality of search results to client 110, such as by sending a list of hyperlinks to the pages associated with the results.

Method 300 may then advance to stage 325 where computing device 400 may capture a behavior associated with the user and at least one of the plurality of search results. The captured behavior may comprise at least one of the relevance factors associated with nodes of relevance classifier 144. For example, the user of client 110 may select one of the search results in a web browser and view it or for 4 seconds before returning to select a different one of the search results. The user may view the second result for 80 seconds before printing the page and exiting the browser. The dwell time of both pages, the selection of a second result, and the printing of the page may all comprise behaviors that may be captured by behavior data collector 120.

From stage 325, where computing device 400 captured a user behavior associated with at least one of the search results, method 300 may advance to stage 330 where computing device 400 may classify a relevance for the search result. Computing device 400 may apply the captured behaviors associated with the search result to decision tree 200 to determine a relevance category and confidence for the page. In the case of a first result with a dwell time of 4 seconds and an exit type of not finished, computing device 400 may search the decision tree for nodes associated with the dwell time and/or exit type.

For example, node 215(2) may comprise a relevance factor of dwell time<5 seconds, a confidence of 95%, and relevance category counts of accept=12, explore=9, and reject=314. Because the first result had a dwell time of only 4 seconds, computing device 400 may classify node 215(2) as "rejected" with a 95% confidence based on the higher reject count. The exit type of not-finished may be associated with a similar node giving a rejected classification with a confidence of 85%. Consistent with embodiments of the invention, the higher confidence may be used (i.e. 95% confidence of rejection), the confidences may be averaged (i.e. 90% confidence of rejection), the lower confidence may be used (i.e. 85% confidence of rejection), and/or a weighting scheme may be used (e.g. the node with the higher number of rejected counts may comprise 75% of the weight, while the lower count node comprises 25%, giving a 92.5% confidence). Further consistent with embodiments of the invention, one node's confidence rating may comprise a base confidence augmented and/or subtracted from depending on other nodes' confidence ratings. For example, the 95% confidence rating of node 215(2) may be increased by 2% because another node supported the rejected classification.

From stage 330, method 300 may advance to stage 335 where computing device 400 may determine whether the search result comprises a potential best-bet search result. The user behavior data collected for a given query which is in the Top N queries (e.g. N=400) may be evaluated for a given result corresponding to the query. The evaluation may comprise a determination of various attributes for the query, such as whether the result is consistently classified as accepted for a configurable number of times by the relevance classifier, whether the ratio of the number of times the result was classified as accepted (A) over the number of times it was rejected (R) is greater than a threshold, for example (A/R) is at least 1, and whether the result is in the top T results (e.g. T=3) for a given query, ordered by the confidence rating. Consistent with embodiments of the invention, if the result is an existing best-bet and the evaluation determines that the result no longer qualifies, the result may be tagged as obsolete and may be recommended to be removed.

If, at stage 335, computing device 400 determines that the search result does not comprise a potential best-bet, method 300 may end at stage 365. Otherwise, method 300 may advance to stage 340 where computing device 400 may notify an administrator of the new potential best-bet recommendation and/or a potentially obsolete best-bet recommendation. For example, application server 140 may provide a report, such as in the form of a web page, to search administrator 150.

From stage 340, method 300 may advance to stage 345 where computing device 400 may determine whether each potential best-bet comprises a best-bet recommendation. For example, a human administrator may view each potential best-bet recommendation and accept or reject the search result as a best-bet. Consistent with embodiments of the invention, potential best-bets may be automatically approved and/or rejected after a certain time period (e.g. 24 hours) or according to a confidence rating. For example, a potential best-bet with a confidence rating of 95% or greater may be automatically approved.

If at stage 345, computing device 400 determines that the search result is not a best-bet, such as if search administrator 150 rejects the potential best-bet recommendation, method 300 may end at stage 365. Otherwise, method 300 may advance to stage 350 where computing device 400 may associate the new best-bet recommendation with the search query. For example, the new best-bet recommendation may be added to best-bet store 136.

After the best-bet recommendation is associated with the search query in stage 350, method 300 may advance to stage 355 where computing device 400 may receive the same search query from a user. For example, a second user may issue the same query or the same user as had previously issued the search query may perform the same search again.

From stage 355, method 300 may advance to stage 360 where computing device 400 may surface the best-bet result in response to the search query. For example, application server 140 may search best-bet store 136 for best-bets associated with the search query. Application server 140 may locate the best-bet and surface it prominently in the search results returned to the searching user. For example, the best-bet recommendation may be placed first in the list of search results, highlighted, or otherwise displayed differently from the other search results. Method 300 may then end at stage 365.

An embodiment consistent with the invention may comprise a system for providing best-bet recommendations. The system may comprise a memory storage and a processing unit coupled to the memory storage. The processing unit may be operative to receive a search query from a user, provide a plurality of search results to the user, capture a behavior associated with the user and at least one of the plurality of search results, and classify a relevance for the at least one of the plurality of search results according to the captured behavior. The classified relevance may comprise a category such as accept, explore, or reject, and the accepted category may indicate a positive correlation between the search result and the search query.

Another embodiment consistent with the invention may comprise a system for providing best-bet recommendations. The system may comprise a memory storage and a processing unit coupled to the memory storage. The processing unit may be operative to provide search results in response to receiving a search query, log a data element associated with at least one of the search results, classify a relevance for the search result according to the logged data element, determine whether the at least one of the plurality of search results comprises a potential best-bet search result according to the classified relevance, and provide a recommendation that the at least one of the plurality of search results be surfaced as a best-bet search result. The relevance may be classified by a decision tree, wherein the decision tree comprises a plurality of nodes associated with captured behaviors. The captured behaviors may be independent of the content of the page being classified. That is, any page content may be evaluated according to the same logged behaviors.

Yet another embodiment consistent with the invention may comprise a system for providing best-bet recommendations. The system may comprise a memory storage and a processing unit coupled to the memory storage. The processing unit may be operative to train a relevance classifier, provide a plurality of search results to the user, capture a behavior associated with the user and at least one of the plurality of search results, classify a relevance for the at least one of the plurality of search results according to an application of the captured behavior to the relevance classifier, determine whether the at least one of the plurality of search results comprises a best-bet search result according to the classified relevance, notify an administrator of the recommendation, determine whether the administrator has approved the best-bet search result, and associate the best-bet search result with the search query. Training the classifier may comprise the processor being operative to, wherein the relevance classifier comprises a decision tree comprising a plurality of nodes and wherein being operative to train the relevance classifier comprises being operative to receive a plurality of log data comprising relevance factors and feedback categories, determine whether the associated relevance factor is associated with a node of the decision tree, create a decision node associated with the relevance factor if not, update a feedback category count associated with the decision node associated with the relevance factor of the log data according to the feedback category of the log data, and, for each of the plurality of decision nodes, assign a confidence value according to the feedback category count of the decision node. The system may be further operative to receive the search query from a second user and provide the best-bet search result to the second user in response to receiving the search query.

Figure 4:
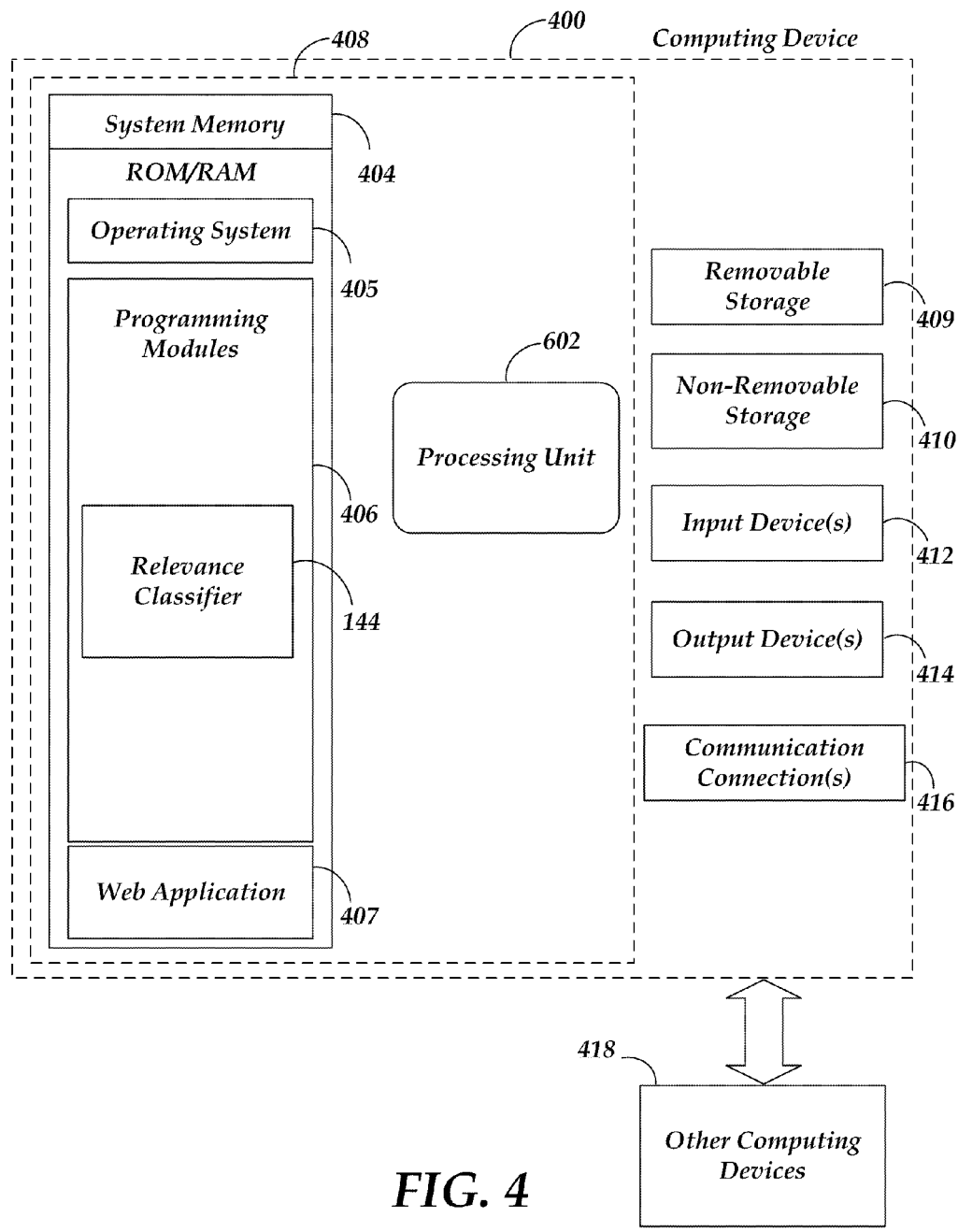
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a web browser application 407. Operating system 405, for example, may be suitable for controlling computing device 400's operation. In one embodiment, programming modules 406 may include relevance classifier 144. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. relevance classifier 144) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a search recommendation, the method comprising:
    training a relevance classifier, wherein the relevance classifier comprises a decision tree comprising a plurality of nodes and wherein training the relevance classifier comprises:
        receiving a plurality of log data associated with users' behavior, wherein each of the plurality of log data comprises a relevance factor and a feedback category comprising at least one of the following categories: accepted, explored, and rejected,
        for each of the plurality of log data, determining whether the associated relevance factor is associated with a node of a decision tree,
        in response to determining that the associated relevance factor is not associated with a node of the decision tree, create a new decision node associated with the relevance factor,
        in response to determining that the associated relevance factor is associated with a node of the decision tree, for each of the plurality of log data, updating a feedback category count associated with a decision node with the relevance factor of the log data according to the feedback category of the log data, and
        for each of the plurality of decision nodes, assigning a confidence value according to the feedback category count of the decision node;
    receiving a search query from a user;
    providing a plurality of search results to the user;
    capturing a behavior associated with the user and at least one of the plurality of search results;
    classifying a relevance for the at least one of the plurality of search results according to the captured behavior, wherein the captured behavior comprises at least one of the relevance factors associated with the relevance classifier;
    determining, according to the relevance classified for the at least one of the plurality of search results, whether the at least one of the plurality of search results comprises a potential best-bet search result;
    in response to determining that the at least one of the plurality of search results comprises the potential best-bet search result, determining whether the confidence value associated with the at least one of the relevance factors is greater than a threshold value; and
    in response to determining that the confidence value associated with the at least one of the relevance factors is greater than the threshold value adding the at least one of the plurality of search results to a store comprising recommended search results.

2. The method of claim 1, wherein the captured behavior comprises at least one of the following: a time the search query was issued, a time the at least one of the plurality of search results was selected, a display position of the at least one of the plurality of search results in a list of the plurality of search results, a dwell time of the at least one of the plurality of search results, a user feedback associated with the at least one of the plurality of search results, an interaction of the user with the at least one of the plurality of search results, and a count of selections by the user from the plurality of search results.

3. The method of claim 1, wherein classifying the relevance for the at least one of the plurality of search results according to the captured behavior comprises classifying the captured behavior according to at least one of the following categories: accepted, explored, and rejected.

4. The method of claim 1, further comprising evaluating a plurality of captured behaviors associated with the at least one of the plurality of search results.

5. The method of claim 4, wherein each of the plurality of captured behaviors are associated with a confidence.

6. The method of claim 1, further comprising:
    receiving a second search query from a second user;
    determining whether the store comprising recommended search results comprises a search result associated with the second search query; and
    in response to determining that the store comprising recommended search results comprises a best-bet search result associated with the second search query, providing the best-bet search result associated with the second search query to the second user.

7. The method of claim 6, wherein determining whether the at least one of the plurality of search results comprises potential best-bet search result comprises determining whether the captured behavior is associated with a total number of positive feedback references greater than a relevance metric.

8. The method of claim 7, wherein the relevance metric comprises a minimum number of positive feedback references.

9. The method of claim 7, wherein the relevance metric comprises a ratio of positive feedback references to negative feedback references.

10. The method of claim 1, further comprising evaluating a plurality of captured behaviors associated with at least one second result of the plurality of search results.

11. The method of claim 1, wherein classifying a relevance for the at least one of the plurality of search results according to the captured behavior comprises applying a plurality of captured behaviors associated with the at least one of the plurality of search results to a decision tree.

12. The method of claim 11, wherein each of a plurality of nodes associated with the decision tree comprises a confidence value.

13. A computer-readable medium which stores a set of instructions which when executed performs a method for providing best-bet recommendations, the method executed by the set of instructions comprising:

training a relevance classifier, wherein the relevance classifier comprises a decision tree comprising a plurality of nodes and wherein training the relevance classifier comprises:
    receiving a plurality of log data associated with users' behavior, wherein each of the plurality of log data comprises a relevance factor and a feedback category comprising at least one of the following categories: accepted, explored, and rejected,
    for each of the plurality of log data, determining whether the associated relevance factor is associated with a node of a decision tree,
    in response to determining that the associated relevance factor is not associated with a node of the decision tree, creating a new decision node associated with the relevance factor,
    in response to determining that the associated relevance factor is associated with a node of the decision tree, for each of the plurality of log data, updating a feedback category count associated with a decision node with the relevance factor of the log data according to the feedback category of the log data, and
    for each of the plurality of decision nodes, assigning a confidence value according to the feedback category count of the decision node;
providing a plurality of search results in response to receiving a search query;
logging a data element associated with at least one of the plurality of search results, wherein the logged data element comprises a captured user behavior associated with at least one of the relevance factors associated with the relevance classifier;
classifying a relevance for the at least one of the plurality of search results according to an application of the logged data element to the relevance classifier;
determining whether the at least one of the plurality of search results comprises a potential best-bet search result according to the classified relevance;
in response to determining that the at least one of the plurality of search results comprises a potential best-bet search result according to the classified relevance, providing a recommendation that the at least one of the plurality of search results be surfaced as a best-bet search result;
receive the search query from a second user;
determine whether the recommendation that the at least one of the plurality of search results be surfaced as the best-bet search result has been approved; and
in response to determining that the recommendation that the at least one of the plurality of search results be surfaced as the best-bet search result has been approved, provide the best-bet search result to the second user.

14. The computer-readable medium of claim 13, wherein providing the recommendation that the at least one of the plurality of search results be surfaced as a best-bet search result comprises:
    notifying an administrator of the recommendation;
    determining whether the administrator has approved the potential best-bet search result; and
    in response to determining that the administrator has approved the potential best-bet search result, associating the potential best-bet search result with the search query.

15. The computer-readable medium of claim 13, wherein classifying a relevance for the at least one of the plurality of search results according to the logged data element comprises assigning a confidence to the at least one of the plurality of search results according to a decision tree, wherein at least one branch of the decision tree comprises the logged data element.

16. The computer-readable medium of claim 15, wherein each of a plurality of branches of the decision tree comprises a logged data element independent of a content of the search query.

17. The computer-readable medium of claim 15, wherein the decision tree comprises a plurality of nodes each comprising a feedback metric associated with one of a plurality of data elements.

18. The computer-readable medium of claim 17, wherein the feedback metric comprises a count of accepted results, a count of explored results, and a count of rejected results.

19. A system for providing best-bet search recommendations, the system comprising:
    a memory storage; and
    a processing unit coupled to the memory storage, wherein the processing unit is operative to:
        train a relevance classifier, wherein the relevance classifier comprises a decision tree comprising a plurality of nodes and wherein being operative to train the relevance classifier comprises being operative to:
            receive a plurality of log data associated with users' behavior, wherein each of the plurality of log data comprises a relevance factor and a feedback category comprising at least one of the following categories: accepted, explored, and rejected,
            for each of the plurality of log data, determine whether the associated relevance factor is associated with a node of a decision tree,
            in response to determining that the associated relevance factor is not associated with a node of the decision tree, create a new decision node associated with the relevance factor,
            in response to determining that the associated relevance factor is associated with a node of the decision tree, for each of the plurality of log data, update a feedback category count associated with a decision node with the relevance factor of the log data according to the feedback category of the log data, and
            for each of the plurality of decision nodes, assign a confidence value according to the feedback category count of the decision node;
        receive a search query from a user;
        provide a plurality of search results to the user;
        capture a behavior associated with the user and at least one of the plurality of search results, wherein the captured behavior comprises at least one of the relevance factors associated with the relevance classifier;
        classify a relevance for the at least one of the plurality of search results according to an application of the captured behavior to the relevance classifier;
        determine whether the at least one of the plurality of search results comprises a potential best-bet search result according to the classified relevance;
        in response to determining that the at least one of the plurality of search results comprises the potential best-bet search result according to the classified relevance, notify an administrator for a recommendation;
        determine whether the administrator has approved the potential best-bet search result;

in response to determining that the administrator has approved the best-bet search result as a best-bet search result, associate the best-bet search result with the search query;

receive the search query from a second user; and provide the best-bet search result to the second user in response to receiving the search query.

* * * * *